United States Patent
Wen et al.

(10) Patent No.: US 7,064,746 B2
(45) Date of Patent: Jun. 20, 2006

(54) METHOD OF STARTING A ONE-TOUCH SYSTEM THROUGH A HOT KEY

(75) Inventors: Say-Ling Wen, Taipei (TW); Chaucer Chiu, Taipei (TW); Frances Dai, Shanghai (CN)

(73) Assignee: Inventec Corp., Taipei (TW)

( * ) Notice: Subject to any disclaimer, the term of this patent is extended or adjusted under 35 U.S.C. 154(b) by 468 days.

(21) Appl. No.: 10/420,698

(22) Filed: Apr. 23, 2003

(65) Prior Publication Data

US 2004/0212585 A1    Oct. 28, 2004

(51) Int. Cl.
*G09G 5/00*    (2006.01)
(52) U.S. Cl. .......................................... 345/172; 713/1
(58) Field of Classification Search ............. 713/1, 713/2, 100; 710/104; 714/23; 709/220, 709/221; 345/156, 168, 172, 115, 520, 521, 345/530, 700, 716, 810
See application file for complete search history.

(56) References Cited

U.S. PATENT DOCUMENTS

| | | | |
|---|---|---|---|
| 6,356,965 B1 * | 3/2002 | Broyles et al. | 710/104 |
| 6,367,074 B1 * | 4/2002 | Bates et al. | 711/170 |
| 6,542,979 B1 * | 4/2003 | Eckardt | 711/173 |
| 2004/0088531 A1 * | 5/2004 | Rothman | 713/1 |
| 2004/0093489 A1 * | 5/2004 | Hsu | 713/2 |
| 2004/0236934 A1 * | 11/2004 | Zimmer et al. | 713/1 |
| 2005/0097309 A1 * | 5/2005 | Chang | 713/1 |

* cited by examiner

*Primary Examiner*—Bipin Shalwala
*Assistant Examiner*—Nitin Patel
(74) *Attorney, Agent, or Firm*—Birch, Stewart, Kolasch & Birch, LLP

(57) ABSTRACT

A method of starting a one-touch system through a hot key is disclosed. Under a computer executable platform, after entering the operating system a routine with boot agent services is executed to enable the user to start the one-touch system at any time via a hot key. The invention further provides the user with an operating interface for the one-touch system for running various functions.

9 Claims, 3 Drawing Sheets

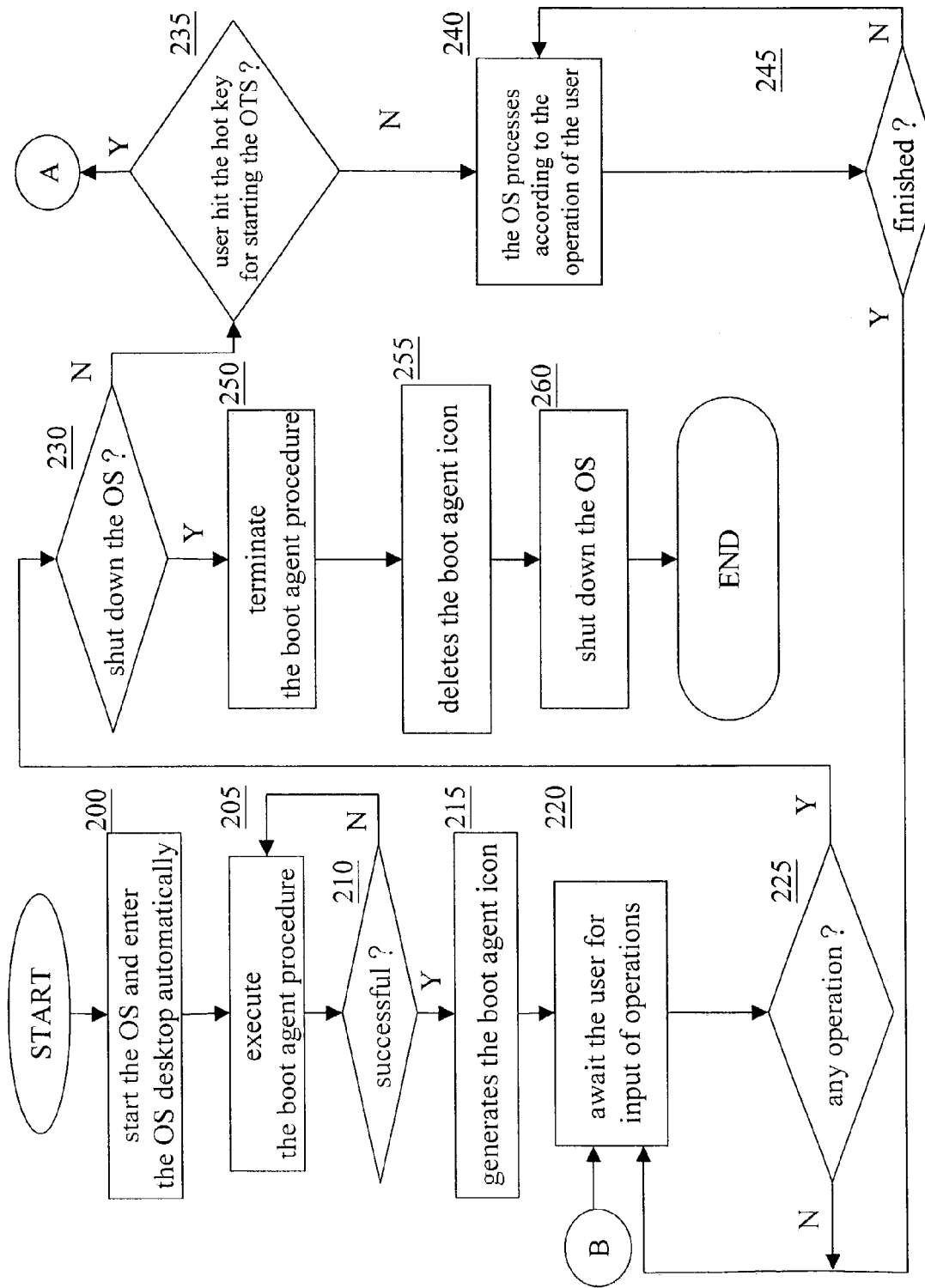
FIG. 2-a

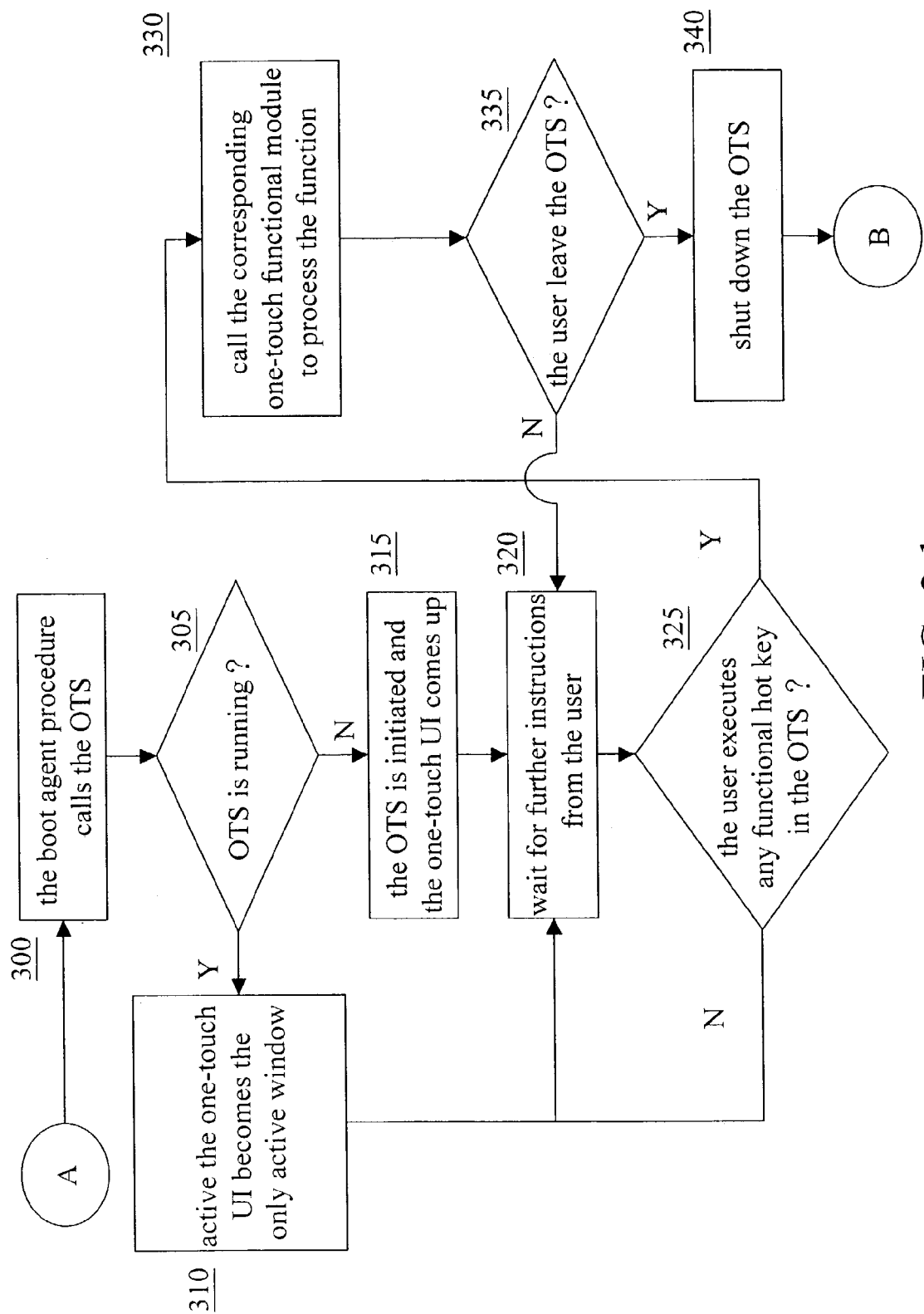
FIG. 2-b

METHOD OF STARTING A ONE-TOUCH SYSTEM THROUGH A HOT KEY

BACKGROUND OF THE INVENTION

1. Field of Invention

The invention relates to a method of starting utilities on an operating system (OS) and, in particular, to a method of executing the one-touch system in the OS. A routine is executed to allow the user to start hooking via a hot key.

2. Related Art

With the continuous growth and development in computer software-related technologies, although many programs offer useful and powerful functions they also cause great troubles to the operations of the computer hardware equipment. For most users, especially those who do not have too much computer software background knowledge, these hard-to-understand techniques and functions may become obstacles to the learning and uses. If the user only wants to use some basic functions but has to go through complicated and tedious operations, such a software program become unfriendly. It is therefore desirable to have a one-touch system (OTS) that provides a friendly user interface (UI) and allows the user to easily perform operations.

On currently familiar computer executable platforms, an operating system (OS), such as Microsoft Windows 2000, Windows 98, and Windows Me, is always required before other utilities can be executed. In fact, the execution and operation of each utility have to go through a period of starting procedure before producing results expected by the user. Even if a simple one-touch system is available, many items on the desktop still confuse users who do not use computers very often. In order for the users to more easily make use of utilities, one should think how to provide a method to enable the user to directly use the functions provided by the one-touch system immediately after entering the OS, without going through other complicated procedures.

SUMMARY OF THE INVENTION

In view of the foregoing problems, the invention provides a method for starting a one-touch system (OTS) via a hot key. A primary objective is to provide a routine with the function of starting an agent service under a computer executable OS platform, so that the user can press a hot key to start the OTS by hooking.

To achieve the above objective, the disclosed method includes the steps of: starting an OS and entering the desktop of the OS, the OS's automatically executing a boot agent procedure, starting a one-touch user interface (UI) when the user depresses the hot key for starting the OTS, accepting the user's selection of a functional hot key in the OTS, and calling a corresponding program module to execute the desired function.

BRIEF DESCRIPTION OF THE DRAWINGS

The invention will become more fully understood from the detailed description given hereinbelow illustration only, and thus are not limitative of the present invention, and wherein:

FIG. 2-a is a flowchart of the disclosed method of starting an OTS through a hot key; and FIG. 2-b is a flowchart of the disclosed method of starting an OTS through a hot key.

DETAILED DESCRIPTION OF THE INVENTION

Figure 1:
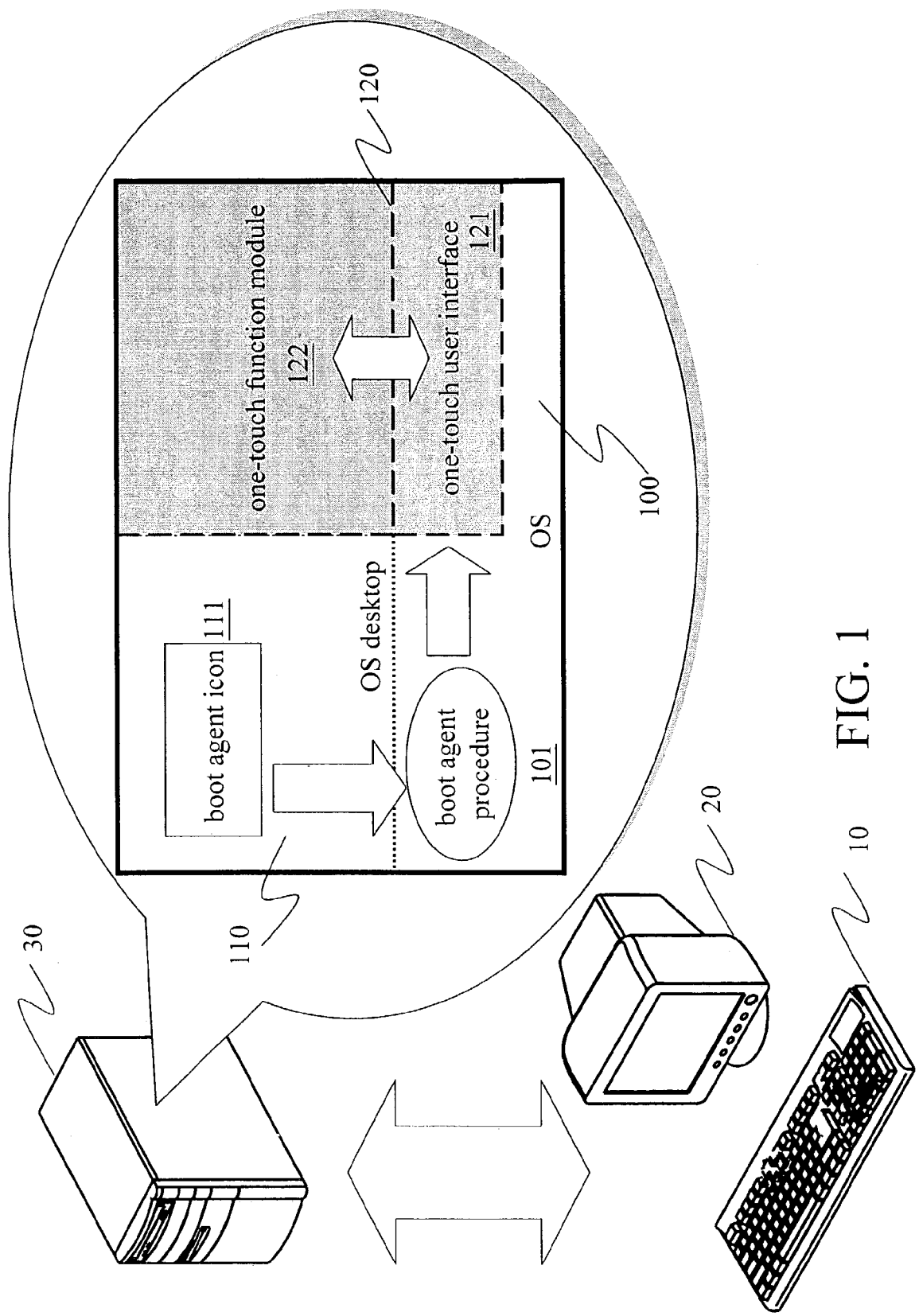
FIG. 1 is a schematic view of structure of the disclosed method of starting an OTS through a hot key.

The invention pertains to an operation of using a hot key to start a one-touch system (OTS) 120 in a computer executable system platform. Various one-touch functions can be initiated throug a friendly one-touch user interface (UI) 121. The OTS 120 refers to the system that enables the user to complete a predetermined function through a single action (which usually means performing calls and executions of a one-touch function module 122 via the depression of one key). Such operations can be sending E-mail messages, faxing, Intenet connection, etc. The hardware structure of the disclosed computer executable system platform has at least: an input device 10, a display deviec 20, and a system host 30. The software structure of the invention includes at least an OS 100, a boot agent procedure 101, and an OTS 120, all stored in the system host 30. The boot agent procedure 101 and the OTS 120 are installed in the OS 100. The boot agent procedure 101 is automatically executed during the booting procedure of the OS 100. The hot keys refer to some specific key combinations that can reduce the user's key-in time. These hot keys are combinations of the number keys 0~9, alphabetic keys A~Z, function keys F1~F12 and other special keys (such as ESC, Page Up, Page Down, etc).

Please refer to FIGS. 2-a and 2-b for the detailed steps of the disclosed method. Please see FIG. 1 when the description refers to the system structure.

After the user starts the system host 30, the OS 100 automatically starts and enters the OS desktop 110 (step 200). The OS 100 follows the settings in its boot procedure to execute the operation of the boot agent procedure 101 (step 205). During the process, the OS 100 automatically determines whether the boot agent procedure 101 runs successfully (step 210). If not successful, step 205 is continued to run the boot agent procedure 101 again. Otherwise, the OS desktop 110 generates the boot agent icon 111 (step 215). Afterwards, the system awaits the user for further input of operations (step 220). Likewise, the OS 100 determines whether the user performs any operation (step 225). If not, the system stands by and keeps waiting (step 220). Otherwise, the system determines whether the operation is to shut down the OS 100 (step 230). If so, the OS 100 terminates the boot agent procedure 101 (step 250) and deletes the boot agent icon 111 on the OS desktop 110 (step 255). Finally, the OS 100 is shut down (step 260), finishing the whole procedure.

If the user's operation is not shutting down the OS 100 (step 230), the OS 100 determines whether the user hit the hot key for starting the OTS 120 (step 235). If so, the procedure enters step A, which is described later. Otherwise, the OS 100 processes according to the operation of the user (step 240). When processing the operation, the OS 100 continuously checks whether the operation is done (step 245). If not, then step 240 continues. If the operation is done, then the procedure goes back to step 220 and the OS 100 waits for other subsequent operations by the user.

After entering step A, which means that the user wants to use the OTS 120, the boot agent procedure 101 calls the OTS (step 300). The action of calling is performed by program hooking. During the call, the OS 100 determines whether the OTS 120 is running (step 315). If the OTS 120 is running, then the one-touch UI 121 of the OTS 120 is displayed on top of everything. In other words, the one-touch UI becomes the only active window (step 310). The procedure then goes to step 320 to wait for further instructions from the user. If the OTS 120 is not running (step 305), then the OTS 120 is initiated and the one-touch UI 121 comes up (step 315), followed by step 320. Afterwards, the OTS 120 determines whether the user executes any functional hot key in the OTS 120 (step 325). If not, then the system stays at step 320 for the user's input. Otherwise, the corresponding one-touch functional module 122 is called to process the function requested by the user (step 330). After finishing the function, the OTS 120 determines whether the user selects to leave the OTS 120 (step 335). If the user does not choose to leave the OTS 120, then the procedure goes back to step 320 to wait for user's further operations. Otherwise, the OTS 121 is shut down (step 340) and the procedure enters step B, i.e. returning to step 220.

In fact, all input operations and controls are performed via input devices. In general, the input device can be a keyboard, a mouse, a digital touch-control panel or a voice recognition system.

EFFECTS OF THE INVENTION

The disclosed method of starting a one-touch system through a hot key enables the user to directly select to run the one-touch system by simply striking a hot key after the computer system enters its operating system. This does not only simplify the execution procedure of utilities, it further reduces the difficulty for users to use and to learn.

By automatically executing a boot agent procedure and the design of software program hooking, the user can perform various one-touch functions provided by the one-touch system via a single action. The execution efficiency is thus enhanced a lot.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for starting a one-touch system (OTS) through a hot key on a computer executable system platform by utilizing a routine with a boot agent service to enable a user to start via a hot key a system that offers one-touch functions and its interface, the method comprising the steps of:
    starting an operating system (OS) and entering the desktop of the OS;
    executing a boot agent procedure;
    selecting a hot key for the OTS;
    starting the OTS and opening a one-touch user interface (UI);
    accepting a functional hot key of the OTS selected by the user; and
    calling the associated program module to perform the function in the one-touch UI of the OTS;
    wherein the one-touch UI is the only one active window displayed in the OS desktop.

2. The method of claim 1, wherein the computer executable system platform includes an input device, a display device, and a system host.

3. The method of claim 2, wherein the system host has the OS, the boot agent procedure, and the OTS.

4. The method of claim 2, wherein all operations, controls, and input actions are performed via the input device.

5. The method of claim 4, wherein the input device is selected from the group consisting of a keyboard, a mouse, a digital touch-control panel and a voice recognition system.

6. The method of claim 1, wherein the boot agent procedure is set in a boot procedure of the OS.

7. The method of claim 1, wherein the boot agent procedure further contains the step of generating an agent icon on the desktop of the OS.

8. The method of claim 1, wherein the step of selecting a hot key for the OTS utilizes the hot key to call the boot agent procedure and starts the OTS through program hooking.

9. The method of claim 1, wherein the one-touch UI displays all one-touch functions and the menu of the functional hot keys.

* * * * *